Sept. 23, 1969      E. R. LOOMIE      3,468,159
DUROMETER
Filed May 10, 1967
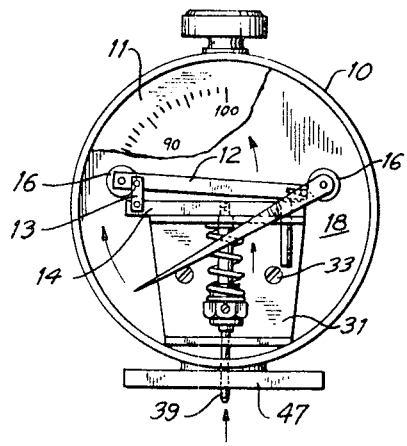
FIG.1
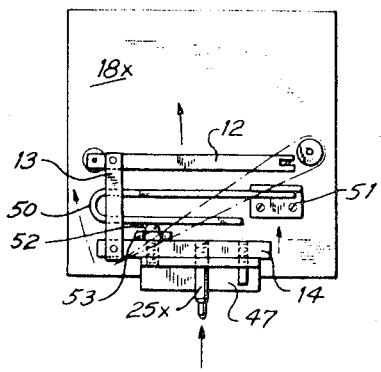
FIG.3
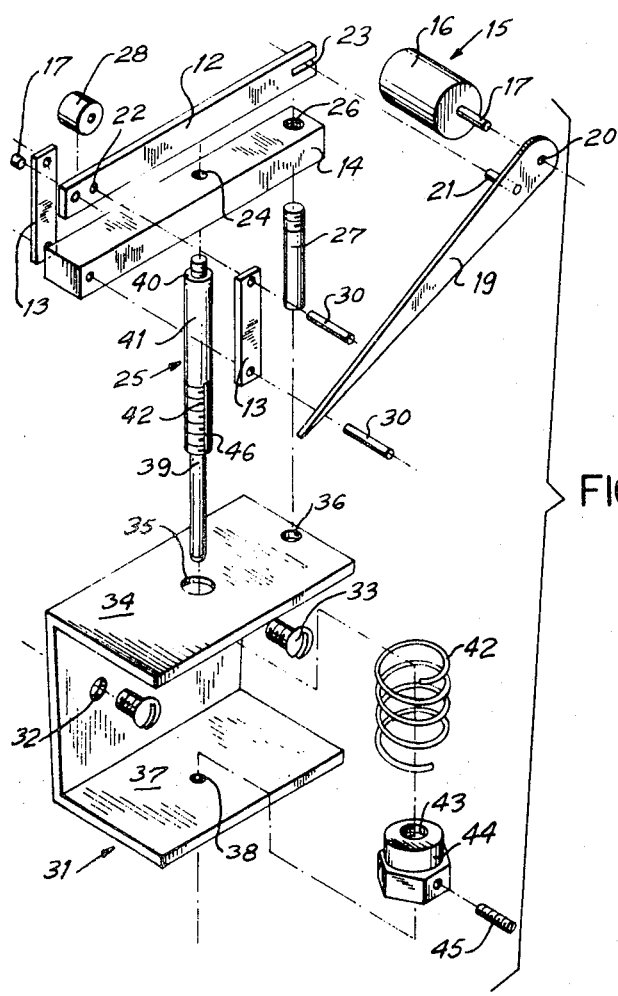
FIG.2
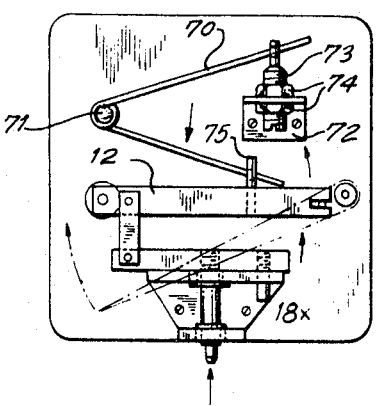
FIG.4
FIG.5

United States Patent Office 3,468,159
Patented Sept. 23, 1969

3,468,159
DUROMETER
Edward R. Loomie, 3904 Fulton Ave.,
Seaford, N.Y. 11783
Filed May 10, 1967, Ser. No. 637,385
Int. Cl. G01n 3/48
U.S. Cl. 73—81                                 1 Claim

ABSTRACT OF THE DISCLOSURE

In abstract form, this invention relates to a lever operated durometer using a power beam having an indentor pin which is linked to co-act with a hinged compensating beam having a forked free end slidably engaging a pin on a dial painter. The durometer of this invention avoids the use of a gear train to magnify the movement of the indentor pin and thus exhibits a quick response to the testing of the specimen being investigated.

---

In the prior art, the durometers generally employ a train of gears to obtain magnification or extended movement of a pointer disposed on a graduated dial. Such a use of gears produces a relatively slow response to the testing procedure and with friction loss in the gear train to thereby allow time for the specimen being tested to creep or flow.

It is an object of this invention to provide a durometer having quick response and which avoids the disadvantages attendant in the use of a gear train to obtain magnification of dial pointer movement.

It is another object to provide a durometer of compact, relatively inexpensive construction.

These and other objects of this invention will become apparent upon reading the following descriptive disclosure of several embodiments thereof and shown in the accompanying drawing in which:

FIG. 1 is a front view of the durometer, with its dial face broken away in part to show the mechanism therein, FIG. 2 is a perspective exploded view of the mechanism of FIG. 1, FIG. 3 is a side view of a modification, showing use of a flat spring to depress the power beam, FIG. 4 is a side view of another modification, showing use of an extension spring operating on the compensating beam to depress in turn the power beam, and FIG. 5 is a side view of yet another modification, showing use of a V-spring operating on the compensating beam to depress in turn the power beam.

Turning to the drawing, and to FIGS. 1 and 2 specifically, the durometer comprises a housing 10, preferably of round or square configuration, having a dial face 11 thereon.

The working mechanism of the durometer of this invention comprises a compensating beam 12 linked by means of a pair of links 13 to a power beam 14. A pair of posts 16 having a spacer portion 15 and a rod portion 17 are secured to the rear wall 18 of the housing 10.

A long, flat pointer 19 having an aperture 20 at its base is disposed on rod 17 and secured thereto by conventional means but allowed to swing freely on rod 17. A pin 21 is secured perpendicular to the plane of the pointer at a suitable distance from aperture 20.

As shown in FIG. 2, the compensating beam 12 is of flat plate construction and is provided with an aperture 22 at one end to hingedly engage rod 30 of a post 16 secured to the wall 18. The free end of the compensating beam 12 is provided with a channel 23 to form a fork adapted to slidingly receive pin 21 of the pointer 19.

The power beam 14 is of flat bar construction having a threaded aperture 24 to receive indentor pin 25 and a threaded aperture 26 adapted to receive a threaded stabilizer rod 27. Since the power beam 14 is wider than the flat compensating beam 12 a spacer 28 is disposed against beam 12 and the two beams 12 and 14 are hingedly secured together by means of the pair of links 13 and a pair of link pins 30.

Also as shown in FIG. 2, a U-shaped bracket or cage 31 is provided in its base with a pair of apertures 32 for securing to the housing wall 18 by means of screws 33. The top wall 34 of case 31 is provided with a suitably large aperture 35 to permit vertical movement of the indentor 25 and also with a second aperture 36 of suitably large diameter to permit vertical movement of the stabilizer rod 27. The bottom wall 37 of the cage 31 is provided with a suitably large aperture 38 to permit vertical movement of the indentor probe 39 outside the housing 10 (FIG. 1) to engage the specimen under test.

As shown in FIG. 2, the indentor 25 is provided with a threaded end 40 being disposed in the threaded aperture 24. The indentor 25 also has an intermediate portion 41 of relatively large diameter having a lower threaded area 42 adjacent the integral probe portion 39. A coil spring 42 is disposed about the indentor portion 41 and against the underside of case wall 34. A suitably flanged adjustment nut 43 is provided with a threaded aperture 44 to receive the threaded area 42. A set screw 45 is disposed in a lateral threaded aperture in groove 46 in the threaded area 42 of the indentor portion 41.

Adjustment of nut 43 on the indentor 25 permits calibration of the durometer prior to use. In use, the flat durometer base 47 is placed on the flat surface of the resilient material to be tested and the extent of the identation of the indentor is read by noting the location of the pointer 19 on the dial face 11. The movement of the power beam, the compensating beam and of the pointer during a test are shown by means of arrows in FIG. 1.

FIG. 3 illustrates a modification using a square shaped durometer configuration having a rear wall 18X. In this modification a flat spring 50, preferably having a reversed bend, is secured at one end to a bracket 51 which is in turn secured to the rear wall 18X. As shown in FIG. 3, the bar 14 is provided with a threaded aperture in which a threaded adjustment rod 52 is disposed. A hexagonal nut 53 having a threaded aperture is disposed on rod 52. Thus, the height of the rod 52 in beam 14 may be raised or lowered and then immovably secured by nut 53, thereby permitting calibration of the mechanism before use. In this modification a modified indentor 25X is used.

FIG. 4 illustrates a lever mechanism using an extension spring 60. The spring 60 is secured to a threaded adjustment rod 61 having an aperture at its lower end to receive the spring. The rod 61 is preferably slotted at its upper end so as to receive the blade of a screw driver to effect adjustments. The rod 61 is disposed in an L-shaped bracket 62 secured to the rear wall 18X of the durometer. A pair of hexagonal threaded adjustment nuts 63 are disposed about the rod 61, one on each side of the bracket 62 having an aperture therein for receiving said rod. In the modification of FIG. 4, the tension spring 60 is adjusted so as to suitably locate the indentor 25X relative to the position of the pointer 19.

FIG. 5 illustrates the use of a V-shaped spring 70 having a complete turn therein disposed upon a post 71 secured to the rear wall 18X of the durometer. In this modification an L-shaped bracket 72 is secured to the wall 18X and a threaded adjustment rod 73 is disposed in an aperture of the bracket 72. A pair of threaded nuts 74 are disposed on rod 73, one on each side of a bracket wall. The rod 73 is provided at its upper end with a suitable aperture to receive one leg of the V-shaped spring 70. As shown in FIG. 5, beam 12 is provided with a loop bracket 75 having an opening adapted to receive the other leg of said spring 70. Adjustment of rod 73 transmits the adjustment tensions in spring 70 to beam 12 to thereby permit adjustment of the durometer as desired.

As illustrated above, the lever operation of the pointer 19 by a forked compensating beam linked to a power beam having the indentor, permits a quick response of the indentor movement to the pointer for a rapid reading on the dial face 11. This characteristic of quick response is especially important in obtaining readings of resilient material having tendencies to creep or flow during the testing procedure.

This invention is of a broad or generic scope and is not limited to the illustrations shown and described herein.

What is claimed is:

1. A dual beam durometer comprising a housing; a power beam; an indentor dependingly secured to said power beam; a compensating beam hingedly secured at one end to said housing and bifurcated at its other end; link means securing said power beam to said compensating beam at said hingedly secured end; a pointer element hingedly secured at its base to said housing; rod means secured to said pointer element and disposed in said bifurcated end of said compensating beam; spring means adapted to movement of said indentor; threaded adjustment means co-acting with said spring means for adjusting movement of said pointer element in relation to movement of said indentor; a bracket having an aperture therein secured to said housing; a stabilizer rod secured to said power beam and disposed in said aperture of said bracket to stabilize the vertical movement of said power beam, said bracket having a ledge disposed below said power beam in space relationship thereto and having an aperture to receive said indentor, said spring means being a compression coil spring disposed around said indentor and bearing at its top rim against said ledge, said adjustment means being an apertured nut movably disposed around said indentor and engaging said coil spring at its lower rim, said indentor having a threaded portion having a longitudinal groove therein, said aperture of said adjustment nut being threaded and mounted on said threaded portion of said indentor, said adjustment nut having a set screw adapted to engage said groove in locking relationship, whereby inward movement of said indentor and the power beam through linking to said compensating beam swings said pointer element in a predetermined manner relative to a graduated dial.

References Cited

UNITED STATES PATENTS 3,136,153   6/1964   Kornblau _____ 73—81

FOREIGN PATENTS 776,020   1/1935   France.

RICHARD C. QUEISSER, Primary Examiner

JOHN K. LUNSFORD, Assistant Examiner